(12) United States Patent
Buchwitz et al.

(10) Patent No.: US 6,755,429 B1
(45) Date of Patent: Jun. 29, 2004

(54) INDEPENDENT SUSPENSION FOR REAR WHEELS OF AUTOMOTIVE VEHICLE

(75) Inventors: Joseph Lee Buchwitz, Westland, MI (US); Manfred Carl Rumpel, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/249,765

(22) Filed: May 6, 2003

(51) Int. Cl.[7] .............................................. B62D 21/11
(52) U.S. Cl. ........................ 280/124.109; 280/124.135
(58) Field of Search .................. 280/124.109, 124.125, 280/124.134, 124.135, 124.136

(56) References Cited

U.S. PATENT DOCUMENTS

| | | | |
|---|---|---|---|
| 4,556,238 A | | 12/1985 | Matschinsky |
| 4,722,544 A | | 2/1988 | Weber |
| 4,826,203 A | * | 5/1989 | Kijima et al. ......... 280/124.109 |
| 4,828,279 A | | 5/1989 | Matschinsky |
| 5,782,484 A | * | 7/1998 | Kuhn, Jr. ............. 280/124.142 |
| 5,820,150 A | * | 10/1998 | Archer et al. ......... 280/124.138 |
| 5,833,026 A | * | 11/1998 | Zetterstrom et al. ........ 180/360 |
| 5,873,587 A | * | 2/1999 | Kawabe et al. ....... 280/124.135 |
| 6,612,593 B2 | * | 9/2003 | Mikasa et al. ......... 280/86.758 |
| 6,634,654 B2 | * | 10/2003 | Mackle et al. ........... 280/5.521 |

* cited by examiner

Primary Examiner—Paul N. Dickson
Assistant Examiner—Toan C To
(74) Attorney, Agent, or Firm—Raymond L. Coppiellie; Dykema, Gossett

(57) ABSTRACT

An independent suspension for a powered rear road wheel of an automotive vehicle includes a subframe attached to a vehicle body with a hub carrier and wheel hub rotatably attached thereto. Laterally extending upper and lower control arms are attached to the subframe, and an internal support link extends between the lower control arm and a forward portion of the hub carrier. A laterally extending toe link is pivoted between the hub carrier and the subframe. The upper control arm is centrally mounted and accommodates a suspension spring extending between the vehicle's body and the upper arm. Central mounting of the upper control arm and spring helps to avoid caster change as the roadwheel moves in jounce and rebound.

12 Claims, 2 Drawing Sheets

INDEPENDENT SUSPENSION FOR REAR WHEELS OF AUTOMOTIVE VEHICLE

BACKGROUND OF INVENTION

FIELD OF THE INVENTION

The present invention relates to a multi-link system for mounting rear wheels of an automotive vehicle.

DISCLOSURE INFORMATION

Vehicle designers have used a variety of independent suspensions for driven rear wheels of automotive vehicles. The provision of independent suspensions for rear drive wheels becomes especially complicated when it is desired to use alternatively a beam axle and an independent suspension on a common vehicle platform. And, it is desired to use both types of axles with a common vehicle floor pan in the case of unitized construction with sub-frame. In this case, commonality dictates that the spring pocket and the shock absorber upper mount be identical, or nearly so, for both types of axles. Thus, although U.S. Pat. No. 4,828,279 discloses a common type of independent suspension for a rear drive wheel of a vehicle, the system of the '279 patent would not accommodate a centrally mounted spring and shock absorber situated in the manner of a beam axle.

The inventors of the present invention have determined that their system will produce excellent results in term of wheel control kinematics when used with a vehicle platform permitting the alternative employment of a beam axle or a fully independent rear suspension.

SUMMARY OF INVENTION

An independent suspension for a powered rear road wheel of an automotive vehicle includes a subframe attached to a vehicle body and a hub carrier with a wheel hub rotatably attached thereto, with the wheel hub defining the wheel center. A laterally extending lower control arm has an inner end and an outer end, with the inner end being pivotably attached to the subframe at a first attachment point leading the wheel center and at a second attachment point trailing the wheel center. The outer end of the lower control arm is pivotably attached to a lower portion of the hub carrier at a third attachment point trailing the wheel center. The lower control arm further has a fourth attachment point located at its outer end and leading the wheel center. An internal support link extends upwardly between the fourth attachment point of the lower control arm and a forward portion of the hub carrier. A laterally extending upper control arm having an inner end and an outer end is pivotably attached at its inner end at a single point to the vehicle subframe. The outer end of the upper control arm is attached to the hub carrier such that the outer end of the upper control arm lies in the transverse vertical plane containing the wheel center. Finally, a laterally extending toe link has a first end pivotably attached to the subframe at a location under the first attachment point of the lower control arm. The toe link also has a second end pivotably attached to the hub carrier in front of and below the wheel center. The toe link is preferably mounted such that it is generally horizontal at normal right height.

According to another aspect of the present invention, the subframe to which the wheel suspension is attached may comprise either a rear suspension subframe or a portion of a vehicle frame providing mounting points for both a front and a rear suspension.

According to another aspect of the present invention, the first attachment point of the lower control arm to the subframe comprises an asymmetric bushing having a lower degree of stiffness in a transverse direction and a higher degree of stiffness in a vertical direction such that the asymmetric bushing will resist moments imposed on the lower arm by the hub carrier during forward braking of the hub carrier while allowing recession of the lower arm in response to longitudinal impacts directed against the roadwheel. This bushing also assists in producing desirable compliance steer characteristics.

According to another aspect of the present invention, the outer end of the upper control arm is attached to the hub carrier at a position which is inboard of the attachment point of the lower control arm to the hub carrier such that the upper control arm is shorter in length than the lower control arm.

The present invention further includes a coil spring interposed between an upper surface of the upper control arm and the body of the vehicle, with the coil spring having a center axis passing through a line defined by the inner and outer ends of the upper control arm. Similarly, a telescoping shock absorber extends between a trailing portion of a lower control arm and the body of the vehicle.

The third attachment point of a lower control arm, which trails a wheel center, is preferably lower than the fourth attachment point of the lower control arm to the internal support link.

It is an advantage of the present independent suspension that the suspension may be packaged and used on a vehicle with a chassis capable of mounting not only an independent suspension, but alternatively, a beam type of driving rear axle.

It is a further advantage of the present invention that the geometry of this suspension exhibits excellent anti-squat and anti-lift characteristics.

It is a further advantage of the present invention that having a suspension spring on the wheel center means that no caster change occurs as the wheel is loaded and unloaded.

It is a further advantage of the present invention that the first attachment point bushing, being relatively softer in a lateral-radial direction provides longitudinal compliance, as well as controlling the compliance steer characteristics of the suspension.

Other advantages, as well as features and objects of the present invention, will become apparent to the reader of this specification.

DETAILED DESCRIPTION

Figure 2:
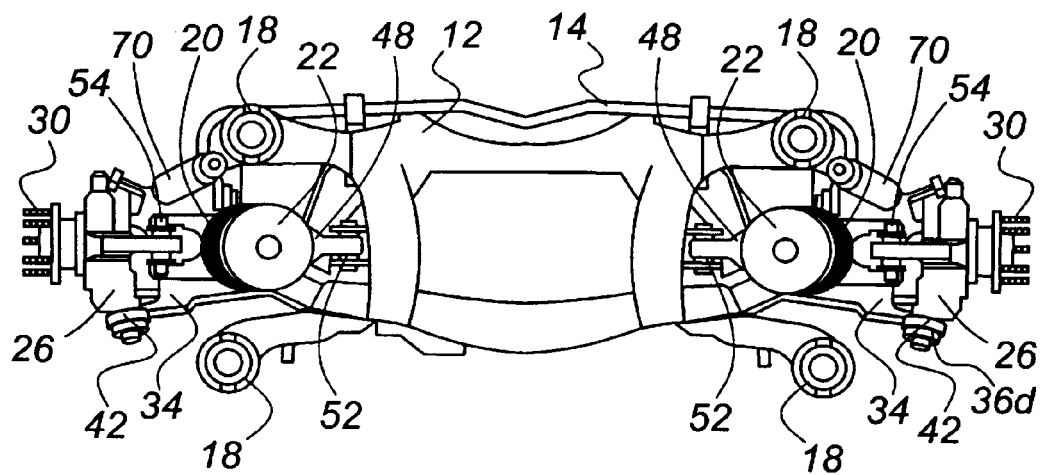
FIG. 2 is a top-side plan view of a suspension according to the present invention.
Figure 3:
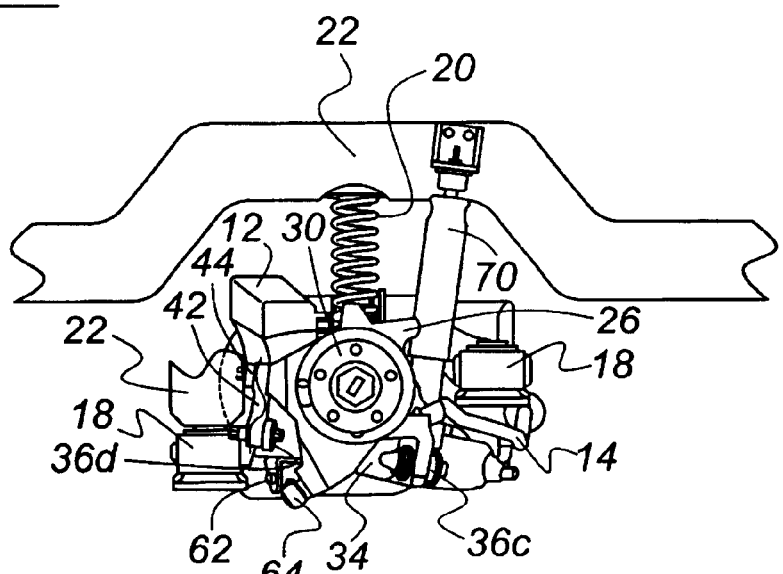
FIG. 3 is a end view of one half of the suspension according to the present invention.

As shown in the various figures, the present suspension is mounted upon subframe 12 which is connected with a vehicle body by a plurality of body mounts 18. Body mounts 18 are designed so as to longitudinally compliant, so as to manage shock loading into the vehicle structure resulting from longitudinally directed impacts against the road wheels. The present suspension is of the short-long arm type. A coil spring 20 is used between body 22 and the upper control arm 48. The spring is shown with particularity in FIGS. 2 and 3. A road wheel (not shown) is mounted upon hub 30 which is mounted to hub carrier 26. Hub carrier 26 is connected to subframe 12 by means of upper control arm 48 and lower control arm 34. Upper control arm 48 has an inner end 52 which is pivotably connected to subframe 12 and an outer end 54 which is connected to hub carrier 26. Upper control arm 48 is centered over hub carrier 26 such that upper control arm 48 lies in a transverse vertical plane containing the wheel center as defined by wheel hub 30. This is seen in FIGS. 2 and 3. The present suspension allows spring 20, and for that matter, shock absorber 70, to be mounted in the same position as the spring and shock absorber would be mounted were vehicles to be built with a beam axle instead of an independent suspension. This means that vehicles having alternatively, an IRS or a beam axle, may be built with exactly the same floor pan and body structure. The central mounting of upper control arm 48, coupled with the central mounting of spring 20 upon upper arm 48 avoids caster change as hub carrier 26, hub 30, and an attached road wheel move in jounce and rebound.

Figure 1:
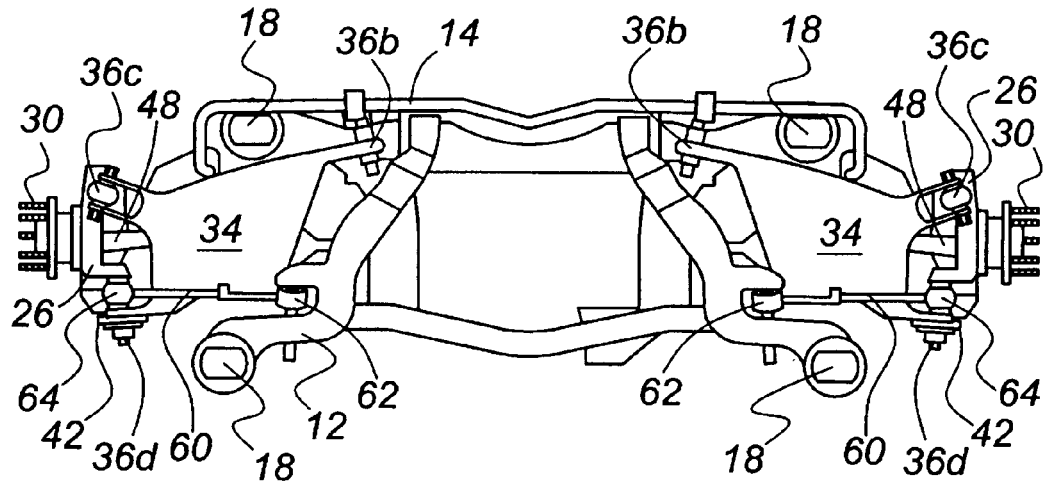
FIG. 1 is a bottom-side plan view of a suspension according to the present invention.

Lower control arm 34 is also attached between subframe 12 and hub carrier 26. Lower control arm 34 has a first attachment point 36a (FIG. 4) which is in front of, or leading, the wheel center as defined by wheel hub 30. First attachment point 36a is inboard at its attachment to subframe 12. The second attachment point for lower control arm 34 is 36b, which is shown in FIG. 1 as being inboard and trailing hub carrier 26 at its attachment to subframe 12. The third attachment point of lower arm 34 is at the outboard trailing end of the arm which is marked as 36c (FIGS. 1–3).

Toe link 60 has an inner end 62 which is pivotably mounted to subframe 12 and an outer end 64 which is pivotably mounted to hub carrier 26 at a position which is in front of and below the wheel center defined by wheel hub 30. Toe link 60 is generally horizontal when a vehicle having the present suspension is at design ride height. Toe control link 60 controls static toe angle as well as kinematic toe angle change, and provides the desirable compliance toe characteristics of the present suspension. Outer end 64 of toe control link 60 is mounted as far forward as possible, while still fitting within the envelope of the vehicle's wheel, so as to provide a maximum lever arm for controlling the toe angle characteristics of hub carrier 26.

Figure 4:
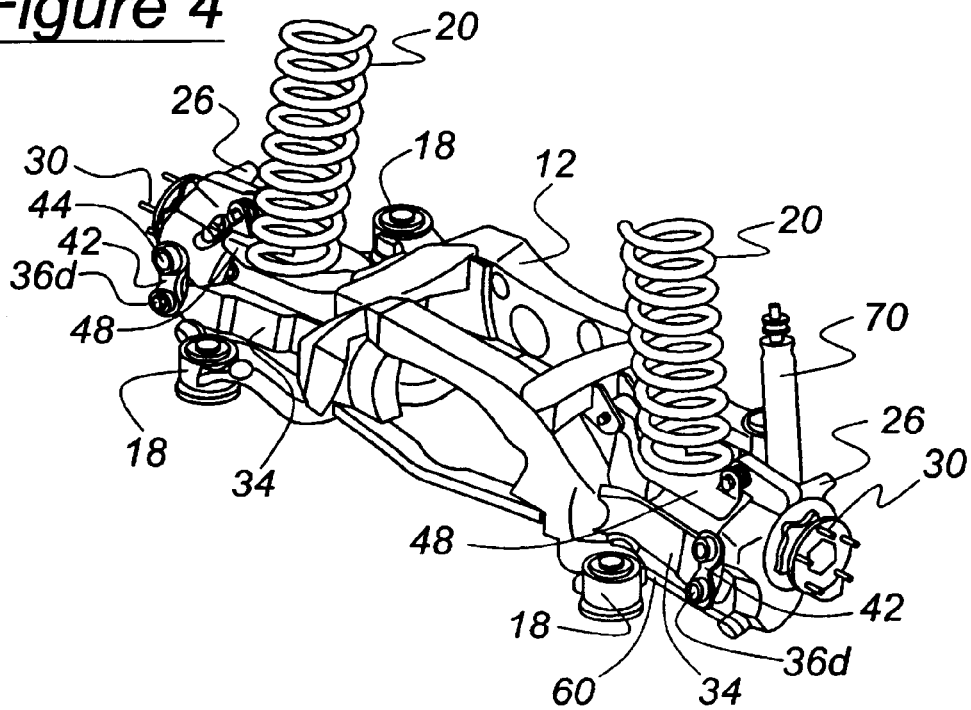
FIG. 4 is a perspective view of a suspension according to the present invention.

Internal support link 42 extends generally upwardly between fourth attachment point 36d of lower control arm 34 and an upper attachment point 44 to hub carrier 26 (see with particularity FIGS. 3 and 4). Internal support link 42 provides control of the caster angle of hub carrier 26, while transmitting brake torque from hub carrier 26 to lower control arm 34. Thus, link 42 serves as a torque reaction link in response to brake torque imposed on the link by hub carrier 26.

The suspension bushing mounted at location 36a of lower control arm 34 is a asymmetric bushing having a lower degree of stiffness in a transverse direction than in a vertical direction. In other words, the bushing deflects in a direction tending to allow lower control arm 34 to pivot backward in a vehicle which is in the forward direction of motion. This allows longitudinal compliance within the suspension system. The stiffness of the bushing at location 36a is greater, however, in vertical direction so as to resist a moment imposed on lower arm 34 by forward direction braking of hub carrier 26. The bushing at location 36a also assists in controlling the compliance steer characteristics of the present suspension system. It should be noted here that the bushing at location 36a has a central axis which is perpendicular to an imaginary line connecting first attachment point 36a of lower control arm 34 with third attachment point 36a of lower control arm 34.

Although the present invention has been described in connection with particular embodiments thereof, it is to be understood that various modifications, alterations, and adaptations may be made by those skilled in the art without departing from the spirit and scope of the invention set forth in the following claims. For example, the present wheel suspension could be employed for non-driven rear wheels as well as driven wheels.

What is claimed is:

1. An independent suspension for a rear road wheel of an automotive vehicle, comprising:

a subframe attached to a vehicle body;

a hub carrier with a wheel hub rotatably attached thereto, with said wheel hub defining a wheel center;

a laterally extending lower control arm having an inner end and an outer end, with said inner end being pivotably attached to said subframe at a first attachment point leading the wheel center and at a second attachment point trailing the wheel center, with the outer end of the lower control arm being pivotably attached to a lower portion of said hub carrier at a third attachment point trailing the wheel center, and with said lower control arm having a fourth attachment point located at its outer end and leading the wheel center;

an internal support link extending upwardly between said fourth attachment point of said lower control arm and a forward portion of said hub carrier;

a laterally extending upper control arm having an inner end and an outer end, with said inner end being pivotably attached at a single point to said subframe, and with said outer end of the upper control arm attached to said hub carrier such that the outer end of the upper control arm lies in a transverse vertical plane containing said wheel center; and a laterally extending toe link having a first end pivotably attached to said subframe at a location under said first attachment point of said lower control arm and a second end pivotably attached to said hub carrier in front of and below said wheel center.

2. An independent suspension according to claim 1, wherein said toe link is mounted such that it is generally horizontal.

3. An independent suspension according to claim 1, wherein said subframe comprises a rear suspension subframe.

4. An independent suspension according to claim 1, wherein said subframe comprises a portion of a vehicle frame providing mounting points for both a front and a rear suspension.

5. An independent suspension according to claim 1, wherein said first attachment point of said lower control arm to said subframe comprises an asymmetric bushing having a lower degree of stiffness in a transverse direction and higher degree of stiffness in a vertical direction, such that said asymmetric bushing will resist moments imposed on said lower arm by said hub carrier during forward braking of the hub carrier, while allowing recession of the lower arm in response to longitudinal impacts directed against the road-wheel.

6. An independent suspension according to claim 1, wherein said outer end of said upper control arm is attached to said hub carrier at a position which is inboard of the attachment point of said lower control arm to said hub carrier, such that said upper control arm is shorter in length than said lower control arm.

7. An independent suspension according to claim 1, further comprising a coil spring interposed between an upper surface of said upper control arm and the body of said vehicle, with said coil spring having a center axis passing through a line defined by said inner and outer ends of said upper control arm.

8. An independent suspension according to claim 1, wherein said third attachment point of said lower control arm, which trails the wheel center, is lower than said fourth attachment point of said lower control arm to said internal support link.

9. An independent suspension according to claim 1, further comprising a plurality of elastomeric mounting devices for attaching said subframe to said vehicle body, with said mounting devices being oriented such that the subframe will be allowed to recess in response to longitudinal impacts directed against the roadwheel.

10. An independent suspension for a powered rear road wheel of an automotive vehicle, comprising:

a subframe attached to a vehicle body by a plurality of longitudinally compliant elastomeric mounts;

a hub carrier with a wheel hub and roadwheel rotatably attached thereto, with said wheel hub defining a wheel center;

a laterally extending lower control arm having an inner end and an outer end, with said inner end being pivotably attached to said subframe at a first attachment point leading the wheel center and at a second attachment point trailing the wheel center, with the outer end of the lower control arm being pivotably attached to a lower portion of said hub carrier at a third attachment point trailing the wheel center, and with said lower control arm having a fourth attachment point located at its outer end and leading the wheel center;

a torque reaction link extending upwardly between said fourth attachment point of said lower control arm and a forward portion of said hub carrier, with said torque reaction link being pivotably mounted at a lower end to said fourth attachment point of said lower control arm, and at an upper end to said hub carrier;

a laterally extending upper control arm having an inner end and an outer end, with said inner end being pivotably attached at a single point to said subframe, and with said outer end of the upper control arm attached to said hub carrier such that the outer end of the upper control arm lies in a transverse vertical plane containing said wheel center;

a laterally extending toe control link having a first end pivotably attached to said subframe at a location under said first attachment point of said lower control arm, and a second end pivotably attached to a forward portion of said hub carrier such that said toe control link is generally horizontal; and a coil spring interposed between an upper surface of said upper control arm and the body of said vehicle, with said coil spring having a center axis passing through a line defined by said inner and outer ends of said upper control arm.

11. An independent suspension according to claim 10, further comprising a telescopic shock absorber extending between a trailing portion of said lower control arm and the body of said vehicle.

12. An independent suspension according to claim 10, wherein said first attachment point of said lower control arm to said subframe comprises a asymmetric bushing having a lower degree of stiffness in a transverse direction and higher degree of stiffness in a vertical direction, such that said asymmetric bushing will resist moments imposed on said lower arm by said hub carrier during forward braking of the hub carrier, while allowing recession of the lower arm in response to longitudinal impacts directed against the roadwheel, with said asymmetric bushing having a central axis which is perpendicular to a line connecting said first attachment point of said lower control arm with said third attachment point of said lower control arm.

* * * * *